United States Patent [19]

Dürr et al.

[11] Patent Number: 5,644,845
[45] Date of Patent: Jul. 8, 1997

[54] DEVICE FOR THE PIVOTABLE FASTENING OF A SAW BASE TO A JIG SAW

[75] Inventors: Paul Dürr, Ulisbach; Armin Breitenmoser, Wattwil, both of Switzerland

[73] Assignee: CEKA Elektrowerkzeuge AG + Co. KG, Wattwil, Switzerland

[21] Appl. No.: 572,080

[22] Filed: Dec. 14, 1995

[30] Foreign Application Priority Data

Dec. 16, 1994 [EP] European Pat. Off. ............... 94119921

[51] Int. Cl.⁶ .................................................. B23D 51/02
[52] U.S. Cl. ...................................... 30/376; 403/93
[58] Field of Search .............................. 30/371, 374, 375, 30/376; 403/93, 94, 97

[56] References Cited

U.S. PATENT DOCUMENTS

| | | |
|---|---|---|
| 602,278 | 4/1898 | Woodward ........................ 403/93 |
| 789,399 | 5/1905 | Westervelt ........................ 403/93 |
| 3,087,519 | 4/1963 | McCarty et al. ................. 30/376 |
| 3,146,809 | 9/1964 | Botefuhr ........................... 30/376 |
| 3,846,912 | 11/1974 | Newbould . | 
| 4,730,397 | 3/1988 | Weiford et al. . |
| 5,121,545 | 6/1992 | Nonaka et al. .................. 30/376 |

FOREIGN PATENT DOCUMENTS

| | | |
|---|---|---|
| 0603552 | 11/1993 | European Pat. Off. . |
| 603552 A1 | 6/1994 | European Pat. Off. ........ 30/376 |
| 24 35 845 | 2/1976 | Germany ........................ 30/376 |
| 7-60538 | 3/1995 | Japan .............................. 30/376 |

OTHER PUBLICATIONS

European Search Report (for EPO 94 11 9921) dated May 16, 1995.

*Primary Examiner*—Hwei-Siu Payer
*Attorney, Agent, or Firm*—Darby & Darby

[57] ABSTRACT

In order to improve a device for the pivotable fastening of a saw base (8) to the housing (1) of a jig saw, with a fastening part (10) which is placed on the saw base (8), with a second fastening part (20) which is placed on the housing (1) of the sabre saw and which matches with the first fastening part (10), and with a connecting means (23) for the detachable connecting of the first with the second fastening part (10, 20) in such a way that an easy, quick pivoting of the saw base (8) is made possible without an additional tool and which in addition ensures a secure retention of the saw base (8) to the housing (1) of the jig saw, it is suggested that the first fastening part (10) exhibit a semi-cylindrically shaped, outwardly toothed surface (13), that the second fastening part (20) exhibit a surface which is configured in a complementary manner to the first fastening part (10) and which is in essence semi-cylindrically shaped and is inwardly toothed, and that the connecting means (23) be a screw (23) which is connected with the first fastening part (10) and which is provided with a manually operable tensioning wheel (22) that is located on the housing (1) of the jig saw.

9 Claims, 3 Drawing Sheets

Fig. 4
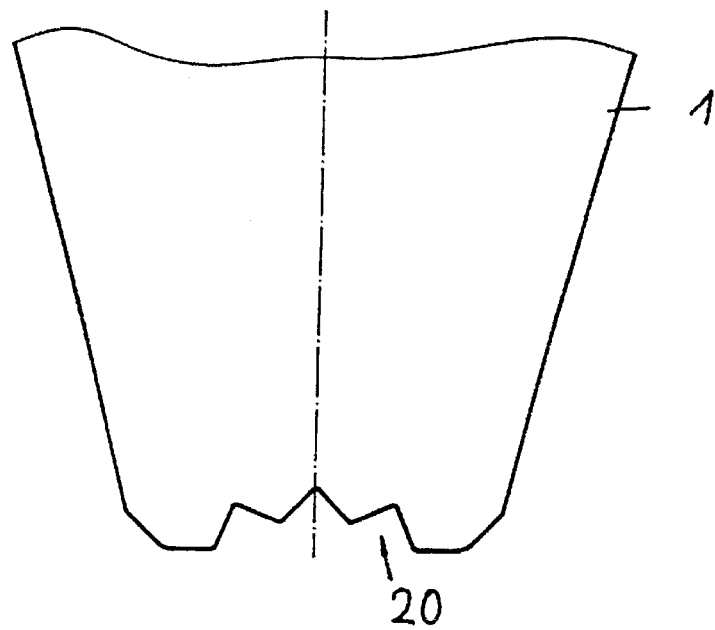
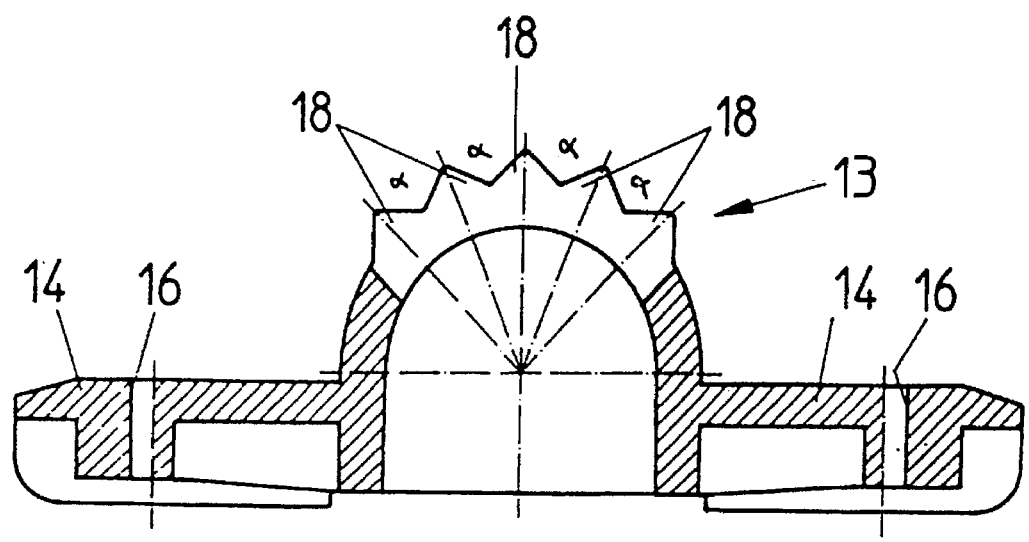
Fig. 3

5,644,845

DEVICE FOR THE PIVOTABLE FASTENING OF A SAW BASE TO A JIG SAW

FIELD OF THE INVENTION

The invention pertains to a device for the pivotable fastening of a saw base to a jigsaw in accordance with the introductory clause of Patent Claim 1.

BACKGROUND OF THE INVENTION

For a long time, jigsaws, especially those for use by home hobbyists, have been known in which—for example, in order to carry out miter cuts—the saw base is fastened to the jigsaw in a pivoting manner. In order to pivot the saw base—for example, into a position that is inclined by 45° to the sawing direction—with the known jigsaw base fastening devices, tools have to be used as aids in order to first loosen the jigsaw base, pivot it, and then to secure it again. This manner of pivoting the jigsaw base is tedious, and cannot be carried out without the necessary tool. In addition, if the jigsaw base is not properly fastened, there exists the danger of the saw base being displaced from the desired inclined position during the sawing procedure.

Therefore, it is the task of the invention to eliminate the disadvantages that have been mentioned, and to improve a device for the pivotable fastening of a saw base to a jigsaw in such a way that a pivoting of the saw base on the jigsaw without the aid of tools is made possible, and that in addition, a fastening of the saw base to the jigsaw in such a way that it is secured against displacement and can be positioned exactly is also made possible.

SUMMARY OF THE INVENTION

Using a device for the pivotable fastening of a saw base to a jigsaw that has the features of the introductory clause of Patent Claim 1, the task is carried out in accordance with the invention by means of the features of the characterizing section of Patent Claim 1.

Advantageous forms of implementation of the invention are the subjects of the subordinate claims.

The following description of the invention is used, in conjunction with the attached drawing, to explain the invention in more detail.

BRIEF DESCRIPTION OF THE DRAWINGS

FIG. 3 A representation cross-sectioned along the line III—III of FIG. 2, of the first fastening part.

FIG. 4 A representation of the second fastening part.

DETAILED DESCRIPTION OF THE INVENTION

Figure 1:
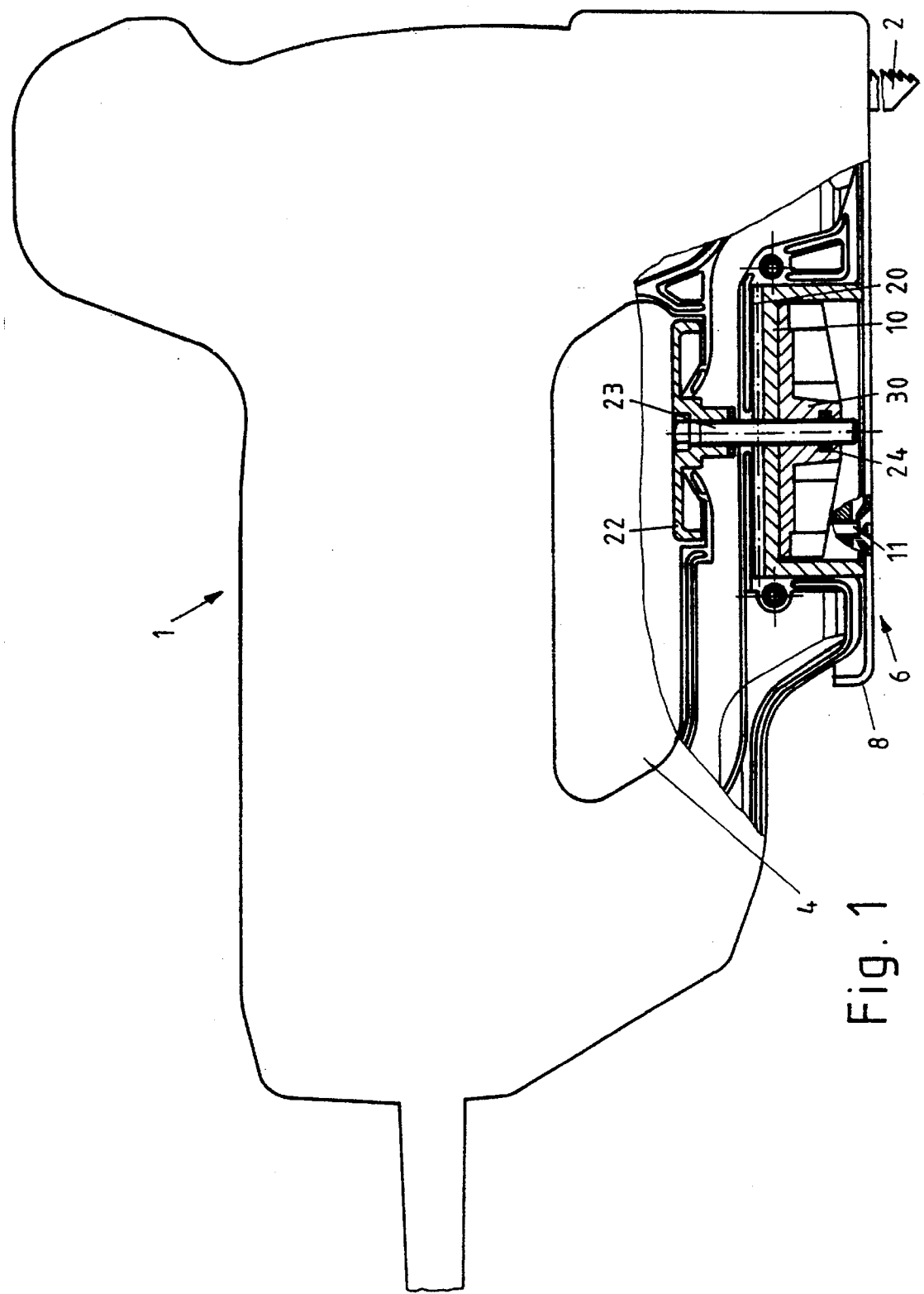
FIG. 1 A partially cross-sectioned side view of a jigsaw with a device for the pivotable fastening of a saw base.

FIG. 1 shows a partially cross-sectioned side view of an electric hand jigsaw. The jigsaw is comprised of a housing 1 in which there is placed a drive mechanism—not shown— for the creating of a reciprocating stroke movement, which is known per se, of a jigsaw blade 2.

In the lower part of the jigsaw housing 1 there is found underneath a grip opening 4 a device 6 for the pivotable fastening of a saw base 8. The device 6 includes a first fastening part 10, to which the saw base 8 is fastened, for example, by means of screws 11.

Figure 2:
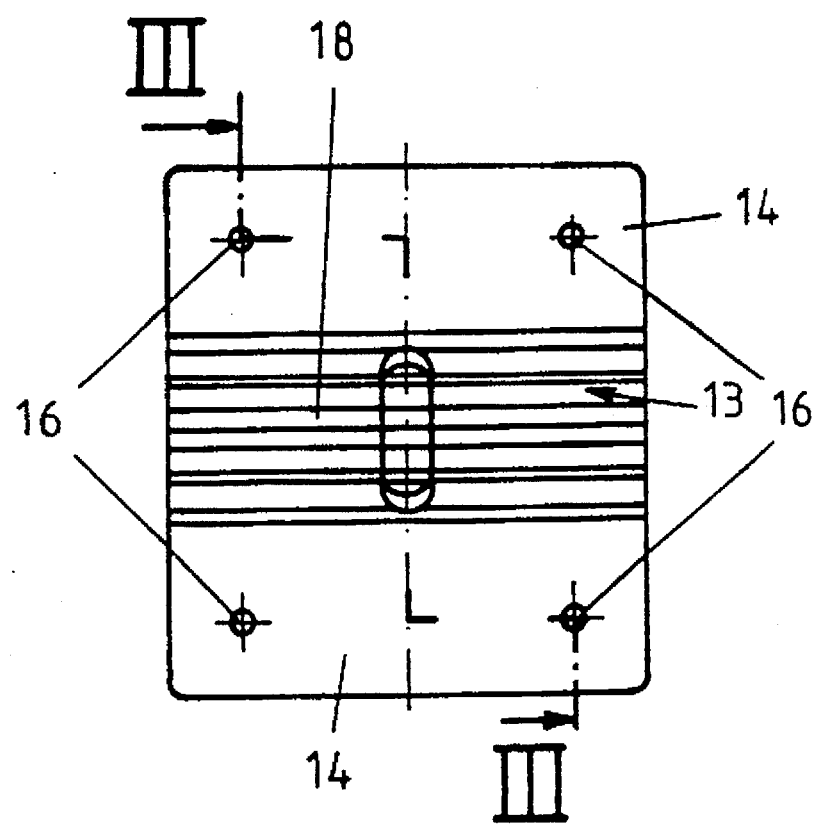
FIG. 2 A top view of a first fastening part of a device for the pivotable fastening of a saw base.

As is made clear in FIGS. 2 and 3 in particular, the first fastening part 10 exhibits a semi-cylindrically shaped, outwardly toothed surface 13, which is surrounded on both sides by plate-like, level projections 14 that are joined as one piece with the outwardly toothed surface 13. In the projections there are provided bores 16 for the fastening of the saw base 8 by means of the screws 11.

The teeth 18 that are formed onto the semi-cylindrically shaped, outwardly toothed surface 13 have a profile which in cross-section exhibits the shape of an isosceles triangle (see FIG. 3). In conjunction with this, every two teeth 18 are arranged displaced from each other by an angle $\alpha$, which corresponds to the smallest possible pivoting angle of the saw base 8.

On the housing 1 there is placed a second fastening part 20, which is configured in a complementary manner to the first fastening part and which in essence exhibits the shape of a semi-cylindrically shaped, inwardly toothed surface. The inward toothing of the second fastening part 20 is arranged so that the outward toothing of the first fastening part 10 engages with it in a non-permanent and a positive-fit manner. For this reason, the teeth of the inward toothing likewise exhibit in cross-section the shape of an isosceles triangle, in conjunction with which every two adjacent teeth are also displaced from each other by an angle $\alpha$, which corresponds to the smallest possible pivoting angle of the saw base to the jigsaw. In conjunction with this, the toothing of the second fastening part 20 does not have to be carried out over the entire surface, rather, it can be present only in those places at which, with various pivoted arrangements of the saw base, the load pressure that is exerted by the jigsaw on the saw base when in the pivoted state actually acts. Furthermore, it is possible that the second fastening part 20 is not made as a separate part, but is instead an integral component of the housing 1.

The two fastening parts 10, 20 are joined to each other by means of a manually operated screw 23, which is located on the jigsaw housing 1 and which is provided with a tensioning wheel 22. For this, there is provided an a third fastening part 30, which is arranged to fit into the first fastening part 10 in a non-permanent and positive manner. The fastening part 30 has, a recess for holding, in such a way that the third fastening part 30 cannot ram, a nut 24, into which the threads of the screw 23 engage.

In order to fasten the saw base 8 to the housing 1 of the jigsaw, the operator turns the tensioning wheel 22, which is joined to the screw 23 in such a way that the nut 24 cannot turn, as a result of which the first fastening part 10, together with the saw base 8 that is fastened to it, is drawn into the second fastening part 20, and, as a result of the triangular shape of the toothing of the first and second fastening parts (10, 20), is centered and fixed in place.

In order to pivot the saw base 8 on the housing 1 of the jigsaw, the tensioning wheel 22 is turned to loosen the fastening until there is no longer any engagement of the toothing. Then, the saw base 8 together with the first fastening part 10 is pivoted by a desired angle, which is an integral multiple of the angle $\alpha$, and while in the pivoted state, it is once again fixed in place and locked to the housing 1 in the way described above.

In this regard, the triangular teeth 18 of the first fastening part 10 and of the second fastening part 20 have proven to be particularly advantageous, since because of them, on the one hand a centering of the fastening is made possible, and on the other, they provide a large surface area and thus a large transmission area for the force that the jigsaw (in the pivoted state) exerts on the saw base. In conjunction with this, each of the two flanks of the triangle-shaped teeth 18 alternately takes on the function of a centering surface and a surface for absorbing the tilting moment, that is, the function of a thrust heel.

In order for the of the device 6 for the pivotable fastening of a saw base 8 to the housing 1 of a jigsaw to be as light as possible but still strong, the first fastening part 10 and the third fastening part 30 consist of molded plastic parts. The second fastening part 20, which is preferable a part of the housing 1, is also made as a molded plastic part. Along with their low weight, these molded plastic parts also offer the advantage of being very strong.

We claim:

1. In combination with a saw base and a housing of a saw, a device for pivotally fastening the saw base to the housing of the saw, comprising:

a first fastener connected to the saw base and having an outwardly toothed, semi-cylindrically shaped surface;

a second fastener having at least a partially, inwardly toothed, semi-circular surface such that the second fastener is configured in a complementary manner to the first fastener; and a connector which detachably connects the first and the second fasteners, the first and the second fasteners permitting an angular pivotal fastening of the housing of the saw relative to the saw base.

2. The combination as in claim 1 wherein the second fastener is a part of the housing.

3. The combination as in claim 1, wherein the teeth of the first and the second fasteners are triangle-shaped in cross-section.

4. The combination as in claim 3, wherein the teeth exhibit in cross-section the shape of an isosceles triangle.

5. The combination as in claim 3, wherein adjacent teeth are displaced from each other by an angle which corresponds to the smallest possible pivoting angle of the saw base.

6. The combination as in claim 1, wherein the first and the second fasteners are molded plastic parts.

7. A device for pivotally fastening a saw base to a housing of a saw, comprising:

a first fastener adapted to be connected to the saw base and having an outwardly toothed, semi-cylindrically shaped surface;

a second fastener having at least a partially, inwardly toothed, semi-circular surface such that the second fastener is configured in a complementary manner to the first fastener; and a connector which detachably connects the first and the second fasteners, wherein the connector is a screw connected to the first fastener, the device further comprising a manually operable tensioning wheel.

8. A device for pivotally fastening a saw base to a housing of a saw, comprising:

a first fastener adapted to be connected to the saw base and having an outwardly toothed, semi-cylindrically shaped surface;

a second fastener having at least a partially, inwardly toothed, semi-circular surface such that the second fastener is configured in a complementary manner to the first fastener; and a connector which detachably connects the first and the second fasteners, wherein the teeth of the first fastener further include a projection on at least one side of the semi-cylindrically shaped, outwardly toothed surface.

9. The device as in claim 8, wherein the projection has at least one opening for receiving connecting means for connecting the saw base to the first fastener.

* * * * *